US010539651B2

(12) United States Patent
Uyehara et al.

(10) Patent No.: US 10,539,651 B2
(45) **Date of Patent: *Jan. 21, 2020**

(54) TIME OF ARRIVAL INFORMATION PASSING IN A DISTRIBUTED ANTENNA SYSTEM

(71) Applicant: CommScope Technologies LLC, Hickory, NC (US)

(72) Inventors: Lance K. Uyehara, San Jose, CA (US); Boris Golubovic, San Francisco, CA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,249

(22) Filed: Nov. 16, 2017

(65) Prior Publication Data

US 2018/0074160 A1 Mar. 15, 2018

Related U.S. Application Data

(63) Continuation of application No. 14/918,182, filed on Oct. 20, 2015, now Pat. No. 9,823,334.

(Continued)

(51) Int. Cl.

*H04W 4/02* (2018.01)
*G01S 5/06* (2006.01)
*G01S 5/00* (2006.01)

(52) U.S. Cl.

CPC .............. *G01S 5/06* (2013.01); *G01S 5/0027* (2013.01); *H04W 4/023* (2013.01)

(58) Field of Classification Search

CPC ........ G01S 5/06; G01S 5/0027; G01S 5/0273; H04W 4/023

(Continued)

(56) References Cited

U.S. PATENT DOCUMENTS 7,336,961 B1 2/2008 Ngan
8,005,050 B2 8/2011 Scheinert et al.

(Continued)

FOREIGN PATENT DOCUMENTS

WO 02085057 A1 10/2002

OTHER PUBLICATIONS

European Patent Application, "Extended European Search Report from EP Application No. 15853527.8 dated May 2, 2018", from Foreign Counterpart of U.S. Appl. No. 14/918,182; pp. 1-11; Published in EP.

(Continued)

*Primary Examiner* — Sam Bhattacharya

(74) *Attorney, Agent, or Firm* — Fogg & Powers LLC

(57) ABSTRACT

Embodiments described herein provide for a method for obtaining location information regarding a wireless unit in a distributed antenna system (DAS). The method includes identifying a first time of arrival of a wireless signal in a time and frequency unit at a first active antenna unit (AAU). A second time of arrival of the wireless signal in the time and frequency unit at a second AAU is also identified. A location of a wireless unit transmitting the wireless signal is estimated based on a location of the first AAU, a location of the second AAU, and a difference between the first time of arrival and the second time of arrival. The location of the wireless unit and an indication that the location corresponds to the time and frequency unit is sent to a baseband unit or serving mobile location center (SMLC).

18 Claims, 2 Drawing Sheets

Related U.S. Application Data

(60) Provisional application No. 62/066,076, filed on Oct. 20, 2014.

(58) Field of Classification Search
USPC ........................................... 455/456.1–456.5
See application file for complete search history.

(56) References Cited

U.S. PATENT DOCUMENTS

| | | | | |
|---|---|---|---|---|
| 8,219,114 | B2 | 7/2012 | Larsen | |
| 8,346,278 | B2 | 1/2013 | Wala et al. | |
| 8,526,970 | B2 | 9/2013 | Wala et al. | |
| 8,570,914 | B2 | 10/2013 | Sauer | |
| 8,638,214 | B2 | 1/2014 | Kummetz | |
| 2010/0178936 | A1* | 7/2010 | Wala | G01S 5/0054 455/456.2 |
| 2012/0021769 | A1* | 1/2012 | Lindoff | G01S 5/0063 455/456.1 |
| 2012/0088522 | A1 | 4/2012 | Mills | |
| 2012/0190380 | A1 | 7/2012 | Dupray et al. | |
| 2012/0281565 | A1 | 11/2012 | Sauer | |

OTHER PUBLICATIONS

International Search Authority, "International Preliminary Report on Patentability for PCT Application No. PCT/US2015/056432", "from Foreign Counterpart to U.S. Appl. No. 14/918,182", dated May 4, 2017, pp. 1-9, Published in: WO.

International Search Authority, "International Search Report and Written Opinion for PCT Application No. PCT/US2015/056432", "from Foreign Counterpart to U.S. Appl. No. 14/918,182", dated Mar. 25, 2016, pp. 1-13, Published in: WO.

United States Patent and Trademark Office, "Notice of Allowance", "from U.S. Appl. No. 14/918,182", dated Jul. 14, 2017, pp. 1-8, Published in U.S.

United States Patent and Trademark Office, "Office Action", "from U.S. Appl. No. 14/918,182", dated Dec. 20, 2016, pp. 1-19, Published in: U.S.

* cited by examiner

TIME OF ARRIVAL INFORMATION PASSING IN A DISTRIBUTED ANTENNA SYSTEM

CROSS-REFERENCE TO RELATED APPLICATIONS

This is a continuation application of U.S. patent application Ser. No. 14/918,182 filed Oct. 20, 2015 and titled "Time of Arrival Information Passing in a Distributed Antenna System," which claims the benefit of U.S. Provisional Patent Application Ser. No. 62/066,076, filed on Oct. 20, 2014, all of which are hereby incorporated herein by reference.

BACKGROUND

A conventional distributed antenna system (DAS) provides indoor or outdoor coverage for wireless communications. Transmitted signals are divided among several antennas in distributed locations to provide enhanced coverage as opposed to a single location transmitter. It can be desired to locate a wireless device with a DAS, for example, for emergency purposes (e.g., 911 calls). However, because the received signals from the distributed antennas are typically combined in the uplink before reaching a corresponding baseband unit or a serving mobile location center (SMLC), the baseband unit or SMLC may not be able to accurately determine the location of the wireless device on its own.

SUMMARY

Embodiments described herein provide for a method for obtaining location information regarding a wireless unit in a distributed antenna system (DAS). The method includes identifying a first time of arrival of a wireless signal in a time and frequency unit at a first active antenna unit (AAU). A second time of arrival of the wireless signal in the time and frequency unit at a second AAU is also identified. A location of a wireless unit transmitting the wireless signal is estimated based on a location of the first AAU, a location of the second AAU, and a difference between the first time of arrival and the second time of arrival. The location of the wireless unit and an indication that the location corresponds to the time and frequency unit is sent to a baseband unit or serving mobile location center (SMLC).

DRAWINGS

Understanding that the drawings depict only examples and are not therefore to be considered limiting in scope, the examples will be described with additional specificity and detail through the use of the accompanying drawings.

In accordance with common practice, the various described features are not drawn to scale but are drawn to emphasize specific features relevant to the examples. Like reference numbers and designations in the various drawings indicate like elements.

DETAILED DESCRIPTION

Embodiments described below relate to a method for estimating a location of a wireless device using a distributed antenna system (DAS). In an example, a time of arrival of a wireless signal at different antennas in the DAS is identified and the DAS estimates a location of a wireless unit based on these times of arrival. The DAS, however, does not know the identity of the wireless unit; therefore the DAS sends to a baseband unit, the location and an indication of an uplink time and frequency unit that the wireless signal occupied.

Figure 1:
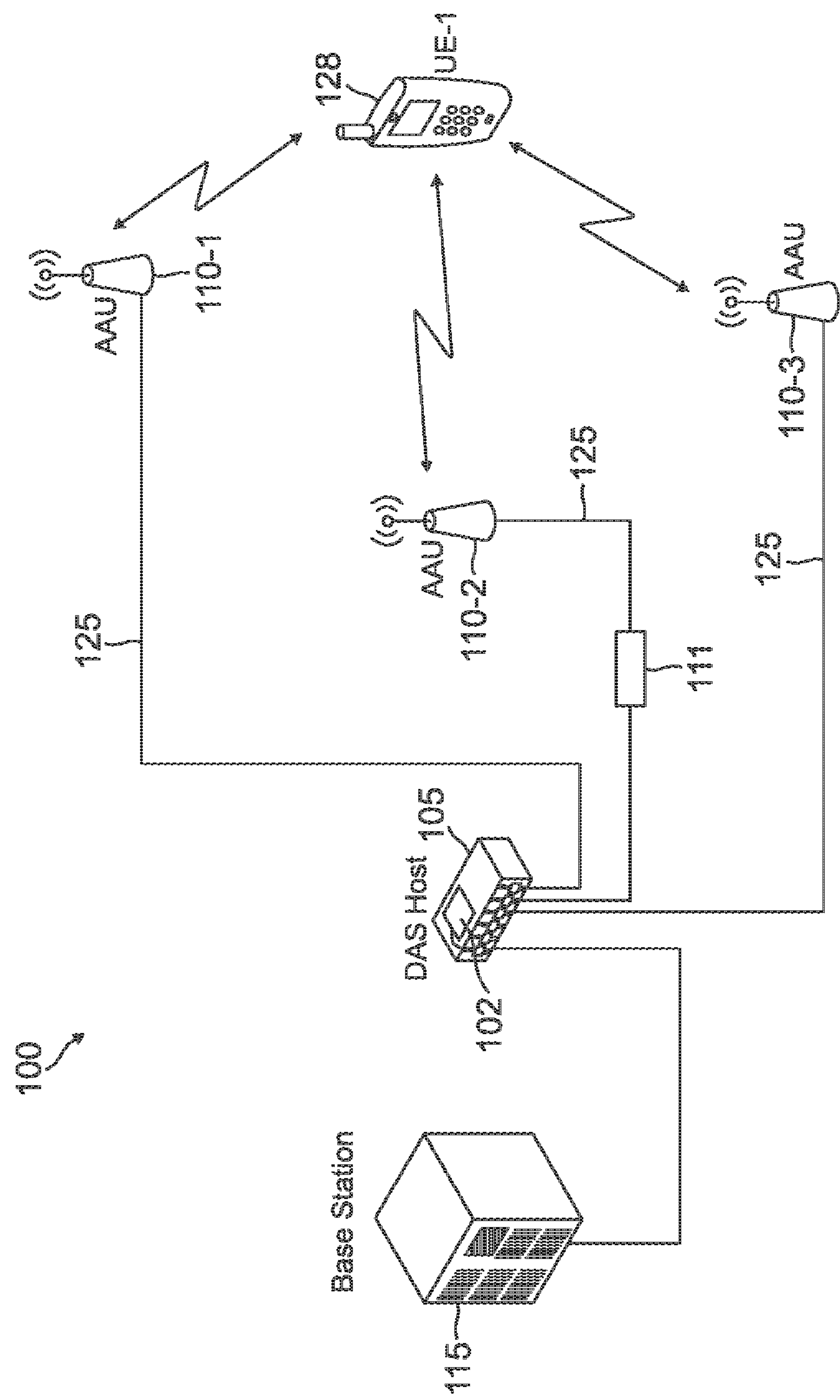
FIG. 1 is a block diagram of an example distributed antenna system.

FIG. 1 is a block diagram of an example communication system including a DAS 100. DAS 100 is communicatively coupled to a base station 115. DAS 103 is used to transport communication signals between one or more upstream devices (for example, base station 115, wireless access points, or other sources of radio frequency signals) and one or more downstream wireless devices (for example, wireless units 128). In some embodiments, base station 115 is a part of a telecommunication-service providers' infrastructure and wireless units 128 comprise customer premise equipment. Base station 115 is an RF source that performs baseband processing such as a baseband unit, a cellular base station (e.g., eNodeB), or base transceiver station (BTS), for example. For simplicity, a single base station 115 is often referred to herein, however, it should be understood that, in some embodiments, the interactions described herein can be performed with multiple base stations 115. The RF source can be a standalone unit or can be implemented as part of a centralized/cloud RAN configuration where multiple baseband units are implemented at a centralized location.

DAS 103 comprises a host unit 105 communicatively coupled to one or more active antenna units 110-1 to **110-*n*. In this embodiment, DAS 103 also includes an intervening device 111 (which may comprise an intermediate or expansion unit, for example) communicatively coupled between host unit 105 and one or more AAUs (AAU 110-2 shown in FIG. 1) to expand the range of host unit 105. Each active antenna unit 110-1 to 110-*n* includes one or more antennas which are used to communicate wirelessly with wireless units 128. Although in this embodiment a certain number of active antenna units 110-1 to 110-*n* and intervening units 111 are coupled to host unit 105, in other embodiments other numbers of active antenna units 110-1 to 110-*n* and intervening units 111 are coupled to host unit 105**. Also, other DAS topologies can be used. For example, one or more host units can be daisy chained together. Also, one or more AAUs can be daisy chained together. Also, the daisy chains can form rings as well as non-ring topologies.

As shown in FIG. 1, host unit 105 is coupled to AAUs 110-1 to **110-*n* and intervening unit 111 through bi-directional point-to-point communication links 125. In an embodiment, communication links 125** comprise fiber optic cables. In other embodiments, however, other communications means such as but not limited to co-axial cables, twisted pair cables (e.g., CAT-5, CAT-6 cables), or microwave communication links may be utilized in various combinations.

Host unit 105 is communicatively coupled to one or more upstream devices (such as one or more base stations 115 or wireless access points). In some embodiments, host unit 105 is coupled to the one or more upstream devices via a physical communication medium. In other embodiments, host unit 105 is communicatively coupled to the one or more upstream devices in other ways (for example, using one or more donor antennas and one or more bi-directional amplifiers or repeaters). In an embodiment, base station 115 comprises an eNodeB.

DAS 103 distributes communication signals between wireless units 128 and base station 115. Wireless units 128 transmit/receive signals to/from active antenna units 110-1 to 110-*n*.

In the downlink direction, DAS 103 operates as a point-to-multipoint transport for signals from one or more base stations 115 to one or more wireless units 128. Downlink base station signals are received by DAS 103 at host unit 105 from the base station 115. The DAS 103 generates transport signals based on the downlink base station signals and sends the transport signals to each of the AAUs 110-1 to 110-*n*. In an example, each of the AAUs 110-1 to 110-*n* in DAS 103 receive identical transport signals. In other examples, one or more subsets of the AAUs 110-1 to 110-*n* receive different transport signals. Each AAU 110-1 to 110-N converts the transport signal from the host unit 105 into an analog RF waveform and transmits the RF waveform to one or more of the wireless units 128 as an over-the-air modulated RF signal. Each AAU 110-1 to 110-N includes a digital-to-analog converter (DAC) (in digital implementations) and radiohead hardware to perform the operations for producing the analog modulated RF waveform from the received transport signal and amplifying the analog modulated RF waveform for broadcast as an over-the-air RF signal.

In the uplink direction, each of the AAUs 110-1 to 110-*n* senses one or more RF signals from one or more wireless units 128 and generates a respective uplink transport signal based on the one or more RF signals. The AAUs 110-1 to 110-*n* send their respective transport signals to the host unit 105, and the host unit 105 aggregates the information from the transport signals to provide a unified base station signal to the base station 115.

The base station signals communicated between the base station 115 and DAS 103 (i.e., between the base station 115 and host unit 105) can be modulated analog signals or signals including digital samples corresponding to a modulated analog signal. The analog signals can be intermediate frequency (IF) or radio frequency (RF) signals. The digital samples can include samples corresponding to a baseband, intermediate frequency (IF), or radio frequency (RF) version of the RF signals. The baseband samples can be complex I/Q samples and the IF and RF samples can be real samples. The signals including digital samples corresponding to an analog modulated signal can conform to a base station communication protocol such as the Common Public Radio Interface (CPRI), Open Base Station Architecture Initiative (OBSAI), or Open Radio Equipment Interface (ORI).

In a digital DAS example, the transport signals sent between the host unit 105 and the AAUs 110-1 to 110-*n* include digital samples corresponding to the modulated analog wireless signals sent and received between the AAUs 110-1 to 110-*n* and the wireless units 128. In the downlink of such an example, the transport signal is a serial data stream including the digital samples. The digital samples can include samples corresponding to a baseband, intermediate frequency (IF), or radio frequency (RF) version of the modulated analog signals. The baseband samples can be complex I/Q samples and the IF and RF samples can be real samples.

In a first implementation of a digital DAS example, the signals communicated between the host unit 105 and the base station 115 are modulated analog RF signals. In the downlink of this first implementation, the host unit 105 receives a modulated RF signal from the base station 115, down converts the RF signal to IF, digitizes (A/D converts) the IF signal to produce real digital IF samples, digitally down-converts the real digital IF samples to produce I/Q (complex) samples, and incorporates the I/Q samples into a downlink transport signal. In some embodiments, the I/Q samples are resampled. In some embodiments, any of the analog signals or digital samples can be filtered to select only a portion of the original bandwidth for transport. In the uplink of this first implementation, the host unit 105 receives an uplink transport signal from one more AAUs 110-1 to 110-*n*, extracts the I/Q samples therefrom, digitally up-converts the I/Q samples to produce real digital IF samples, D/A converts the real digital IF samples to a modulated analog IF signal, up-converts the analog IF signal to an RF signal and sends the RF signal to the base station 115. In some embodiments, digital samples from respective transport signals can be digitally summed to form unified data for the base station 115.

In a second implementation of the digital DAS example, the signals communicated between the host unit 105 and the base station 115 carry digital I/Q samples corresponding to a modulated analog signal. In the downlink of this second implementation, the host unit 105 receives a signal from the base station 115 including digital I/Q samples (e.g., a CPRI signal) and incorporates the digital I/Q samples into a downlink transport signal to the AAUs 110-1 to 110-*n*. In some embodiments, the I/Q samples are resampled. In some embodiments, the digital samples can be filtered to select only a portion of the original bandwidth for transport. In the uplink of this second implementation, the host unit 105 receives an uplink transport signal from one or more AAUs 110-1 to 110-*n*, extracts I/Q samples therefrom, and sends the I/Q samples to the base station 115 (e.g., in a CPRI signal). In some embodiments, digital samples from respective transport signals can be digitally summed to form unified data for the base station 115.

In any case, in a digital DAS example, the transport signals carry packets of digital samples corresponding to a modulated electromagnetic radio-frequency waveform.

In an analog DAS example, the transport signals between the host unit 105 and the AAUs 110-1 to 110-*n* include a modulated analog IF signal. In such an example, the host unit 105 can send and receive modulated analog RF signals with the host unit 105. The host unit 105 can convert between the modulated RF signals and modulated analog IF signals, which are transported between the host unit 105 and AAUs 110-1 to 110-*n*.

In some examples, DAS 103 can be an analog and digital DAS and transport both signals including digital samples and analog modulated IF signals concurrently.

The AAUs 110-1 to 110-*n* perform similar conversions for digital and analog DAS functions respectively. In the uplink of a digital DAS example, a AAU 110-1 to 110-*n* senses a modulated wireless RF signal via an antenna, down converts the RF signal to IF, digitizes (A/D converts) the IF signal to produce real digital IF samples, digitally down-converts the real digital IF samples to produce I/Q (complex) samples, and incorporates the I/Q samples into a downlink transport signal. In some embodiments, the I/Q samples are resampled. In some embodiments, any of the analog signals or digital samples can be filtered to select only a portion of the original bandwidth for transport. In the downlink of this digital DAS example, the AAU 110-1 to 110-*n* receives an uplink transport signal from the host unit 105, extracts the I/Q samples therefrom, digitally up-converts the I/Q samples to produce real digital IF samples, D/A converts the real digital IF samples to a modulated analog IF signal, up-converts the analog IF signal to an RF signal, amplifies and radiates a wireless RF signal to one or more wireless units 128.

The DAS 100 also includes a location estimation module 102 to estimate a location of a wireless unit 128 that is communicating through the DAS 100. In the example shown in FIG. 1, the location estimation module 102 is implemented by the host unit 105. In other examples, however, the location estimation module 102 can be a standalone unit or can be implemented by one of the AAUs 110. The location estimation module 102 can be implemented as instructions stored on a processor readable medium and configured to cause one or more processors, when executed thereby, to implement the functionality described herein.

Figure 2:
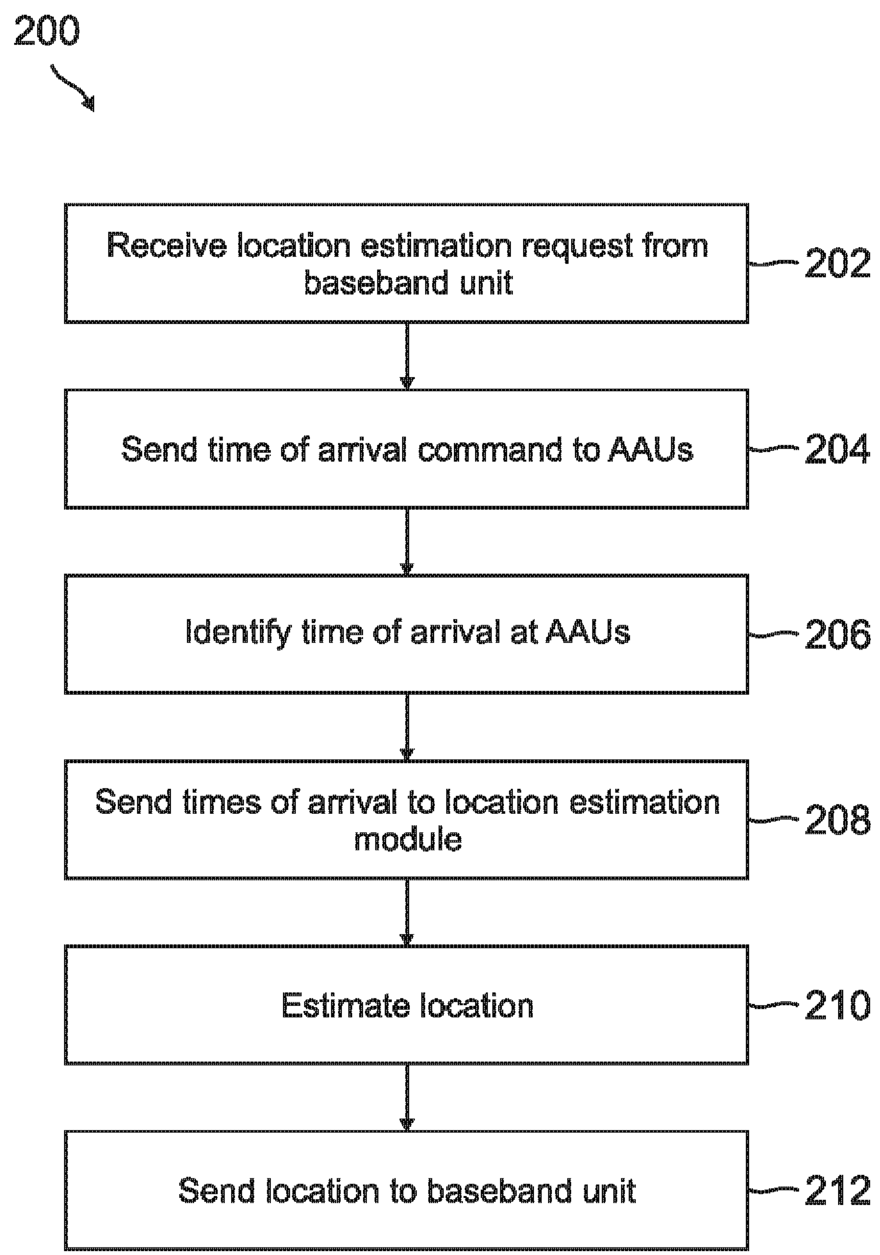
FIG. 2 is a flow diagram of an example method for estimating a location of a wireless unit using the DAS of FIG. 1.

FIG. 2 is a flow diagram of an example method 200 for estimating a location of a wireless unit with a DAS 100. In an example, the location estimation process is initiated by a request from a baseband unit or a serving mobile location center (SMLC) to the location estimation module 102 to estimate a location of a wireless unit 128 that has been allocated to a first time and frequency unit in the uplink RF spectrum (block 202). The baseband unit or SMLC can be located in a device upstream from the host unit 105, such as a base station 115, or can be located in the host unit 105 itself. In an example, the baseband unit/SMLC initiates a request to estimate a location based on an emergency call being received from the wireless unit 128. In particular, the baseband unit/SMLC upon receiving the emergency uplink signal from the wireless unit 128 implements the location estimation process for the wireless device 128. To implement the location estimation process, the baseband unit/SMLC sends a request to the location estimation module 102, wherein the request indicates a time and frequency unit allocated to the wireless unit 128 in which the location estimation is to be determined. The baseband unit/SMLC being able to modulate and demodulate the wireless RF signals, knows the identity and resource allocations for the wireless unit 128. The DAS 100, however, does not typically demodulate the signals generated by the baseband unit or the wireless unit 128. Thus, the DAS 100 does not know the identity of the wireless device 128 or the resources that are allocated to the wireless device 128. Accordingly, the baseband unit/SMLC identifies the resources (e.g., the time and frequency unit(s)) that are allocated to the wireless unit 128 in which the location is to be estimated, and sends the time and frequency unit(s) in the request to the location estimation module 102.

The time and frequency unit(s) are time and frequency unit(s) of the RF communication protocol used for communication between the baseband unit and the wireless units 128. In an example, the baseband unit and the wireless units 128 communicate using a protocol that conforms to a long-term evolution (LTE) standard. In such an example, a time and frequency unit is a resource element as defined by the LTE standard. Typically, multiple resource elements (referred to as a resource block) are allocated to a given wireless unit 128. Accordingly, in an example, the time and frequency unit(s) in the request sent from the baseband unit are resource element(s) of an LTE protocol. In a particular example, the time and frequency unit(s) are a resource block of an LTE protocol. In other examples, the baseband unit and the wireless units 128 communicate using other protocols including but not limited to other OFDM systems (e.g., WiMAX) and TDMA-FDMA systems (e.g., GSM, IS-136 TDMA), and the time and frequency unit(s) are allocated elements of the respective protocol.

In examples where the host unit 105 communicates with the upstream device (e.g., base station 115) using baseband data (e.g., CPRI signals), the upstream device provides the host unit 105 with a map of the time and frequency units available in the RF signals between the baseband unit and the wireless unit(s) 128. By virtue of this map, the location estimation module 102 knows the time and frequency units that can be allocated to a given wireless unit 128. In examples where the host unit 105 communicates with the upstream device (e.g., base station 115) using RF signals, the host unit 105 can be configured to demodulate a downstream control channel from the upstream device to obtain the map of time and frequency units available in the RF signals between the baseband unit and the wireless unit(s) 128. In other examples, the host unit 105 can be configured to receive the map of time and frequency units from the upstream device over an auxiliary channel. In any case, the host unit 105 can provide the map of time and frequency units to the location estimation module 102 and/or AAUs 110 if appropriate.

Upon receiving the request from the baseband unit/SMLC, the location estimation module 102 send out a command to the AAUs 110 to identify a time of arrival of an uplink wireless RF signal in the time and frequency unit(s) indicated in the request from the baseband unit/SMLC (block 204). The command from the location estimation module 102 can be sent in any suitable manner, such as by using a communication channel implemented in the DAS 100 between the host unit 102 and the AAUs 110.

Upon receiving the command from the location estimation module 102, each AAUs 110 identifies a time of arrival of an uplink wireless signal in the time and frequency unit(s) indicated in the command from the location estimation module 102 (block 206). Each AAUs individually determines its own time of arrival of the wireless RF signal. An AAU can determine this time of arrival by listening for a signal in the time and frequency unit(s) indicated and can time stamp such a signal if it is present. Since the time of arrival of a signal at an AAU 110 is based on a physical distance that the wireless unit 128 is from the AAU 110, the time of arrival of a wireless signal from the wireless unit 128 at each AAU 110 can be different. If an AAU 110 is not in range of the wireless signal from the wireless unit 128, that AAU 110 will not sense a wireless signal and, accordingly, will not identify a time of arrival. If an AAU 110 is within range of the wireless signal form the wireless unit 128, the AAU 110 can sense the wireless signal and determine the time of arrival of the signal. Ideally, multiple AAUs 110 will be able to sense the wireless signal and determine the time of arrival thereof. Notably, the AAUs 110 are identifying the time of arrival of a signal in the time and frequency unit(s) indicated in the command from the location estimation module 102. That is, if a wireless signal is sensed in a time and frequency unit that is not included in the time and frequency unit(s) indicated by the location estimation module 102, the time of arrival of such a signal is not relevant for the location estimation as such a signal is not from the wireless unit 128 in which the location is to be determined.

In an example, the wireless signal from the wireless unit 128 in the time and frequency unit(s) that is time stamped by the AAUs 110 is a non-location purpose signal that is transmitted to communicate information (e.g., voice signals or data) to another device (e.g., to another telephone or computer). For example, the wireless signal can be a wireless transmission in the ordinary course of communicating by the wireless unit 128. Accordingly, the time and frequency unit(s) allocated to the wireless unit 128 can be general purpose time and frequency unit(s) that could be allocated to any similar wireless unit 128. In another example, the wireless signal from the wireless unit 128 is a control signal that occurs in known time and frequency unit(s), such as an uplink sounding signal or a demodulation reference signal.

In another example, the wireless signal from the wireless unit 128 in the time and frequency unit(s) that is time stamped is a special purpose signal that the wireless unit 128 transmits specifically for determining its location. In an implementation of such an example, the wireless signal may have increased power or may be transmitted in special purpose time and frequency unit(s) such as time and frequency unit(s) allocated for determining a location of a wireless unit 128. In an implementation of such an example, a command need not be sent from a baseband unit/SMLC to a location estimation module 102 to initiate the location estimation process. Instead, the AAUs 110 can continuously monitor the time and frequency unit(s) allocated for location determination and if a wireless signal is received in the time and frequency unit(s), identify a time of arrival of the wireless signal. In such an example, the wireless unit 128 can be configured to automatically transmit a signal in the special purpose time and frequency unit(s) allocated to determine location in certain circumstances (e.g., if a 911 call is initiated), or the wireless unit 128 can be commanded to transmit a signal in the special purpose time and frequency unit(s) by the baseband unit.

If an AAU 110 senses a wireless signal in the time and frequency unit(s), the AAU 110 can determine the time of arrival of the signal at the AAU 110. The AAU 110 can determine this time of arrival in any suitable manner such as by signal envelope detection, correlation with references, or cross correlation between signals. The AAU 110 then sends the time of arrival of the signal to the location estimation module 102 (block 208). Accordingly, the location estimation module 102 can receive a first time of arrival from a first AAU 110-1, wherein the first time of arrival is a time of arrival of the wireless signal from the wireless unit 128 at the first AAU 110-1. The location estimation module 102 can also receive a second time of arrival from a second AAU 110-2, wherein the second time of arrival is a time of arrival of the wireless signal from the wireless unit 128 at the second AAU 110-2. The location estimation module 102 can also receive a third time of arrival from a third AAU 110-2, wherein the third time of arrival is a time of arrival of the wireless signal from the wireless unit 128 at the third AAU 110-3.

In an example, only AAUs 110 that sense a wireless signal in the time and frequency unit(s) send a message to the location estimation module 102, wherein the message includes the corresponding time of arrival. In another example, all AAUs 110 send a message to the location estimation module 102, whereby AAUs 110 that do not sense a wireless signal in the time and frequency unit(s) send a message indicating that they did not sense a wireless signal in the time and frequency unit(s).

Upon receiving the times of arrival from a plurality of the AAUs 110, the location estimation module 102 can estimate a location of the wireless unit 128 based on a difference between the multiple times of arrival (block 210). The location estimation module 102 can have a database accessible thereby that includes the physical location of each of the AAUs 110. Using this information and the times of arrival of the wireless signal at multiple AAUs 110, the location estimation module 102 can estimate a location of the wireless unit 128. In an example, the location estimation module 102 can use multi-lateration to estimate the location of the wireless unit 128 corresponding to the wireless signal in the time and frequency unit(s) indicated.

In an example, the AAUs 110 can also send to the location estimation module 102, an indication of the time and frequency unit(s) corresponding to their respective time of arrival. Such an indication of the time and frequency unit(s) can be beneficial if multiple location estimation procedures are being implemented concurrently. If so, sending an indication of the time and frequency unit(s) corresponding to the time of arrival information identifies which location estimation procedure the time of arrival information pertains to. Such an indication of the time and frequency unit(s) corresponding to the time of arrival can be made in any suitable manner such as by a reference to the command from the location estimation module to obtain the time of arrival or by sending a resource element or resource block with the time of arrival information.

Upon estimating a location, the location estimation module 102 can send the location to the baseband unit/SMLC (block 212). In examples where the baseband unit/SMLC is in an upstream device (e.g., base station 115), the location estimation module 102 can send the location to the base station 115. The location determined by the location estimation module 102 can be any appropriate location, such as a globally referenced location (e.g., latitude and longitude coordinates), a range of locations, a locally referenced location (e.g., floor 5 of the building 315, section 21 of a stadium, near the corner of 10$^{th}$ and Marquette in Minneapolis), a location with reference to the location of the host unit 105 or the location of the base station (e.g., 300 feet south of host unit 105), or other location. The location can be provided in any suitable format. For example, the location can be provided to the baseband unit/SMLC in coordinates of the global coordinate system (e.g., latitude and longitude). In another example, the location can be provided in terms relative to the location of the AAUs 110 (e.g., 1$^{st}$ floor, NE corner of XXX building, or Office 301). In some examples, multiple of such location formats can be provided to the baseband unit/SMLC.

In some examples, the location estimation module 102 can send to the baseband unit/SMLC, an indication of the time and frequency unit(s) corresponding to the location. Such an indication of the time and frequency unit(s) can be beneficial if multiple location estimation procedures are being implemented concurrently. If so, sending an indication of the time and frequency unit(s) corresponding to the location information identifies which location estimation procedure the location pertains to. Such an indication of the time and frequency unit(s) corresponding to the location can be made in any suitable manner such as by a reference to the request from the baseband unit/SMLC to obtain the location or by sending a resource element or resource block with the location information.

In some examples, the location estimation module 102 can calculate other data for the wireless unit 128 communicating over respective time and frequency unit(s). Such other data can include a power level corresponding to the signal(s) received from the wireless unit 128, a speed, direction, or velocity (both speed and direction) of motion of the wireless unit 128, and/or an angle from which a wireless signal from the wireless unit 128 is received at a given AAU 110. This other data can be provided to the baseband unit/SMLC along with the indication of the time and frequency unit(s) corresponding thereto as discussed above. In some examples, this other data can also be used to determine a location for the wireless unit 128.

In exemplary embodiments, cellular RF signals may utilize various wireless protocols and in various bands of frequency spectrum. For example, the cellular RF signals may include, but are not limited to, licensed RF bands, 800 MHz cellular service, 1.9 GHz Personal Communication Services (PCS), Specialized Mobile Radio (SMR) services, Enhanced Special Mobile Radio (ESMR) services at both 800 MHz and 900 MHz, 1800 MHz and 2100 MHz Advanced Wireless Services (AWS), 700 MHz uC/ABC services, two way paging services, video services, Public Safety (PS) services at 450 MHz, 900 MHz and 1800 MHz Global System for Mobile Communications (GSM), 2100 MHz Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), or other appropriate communication services. The system described herein are capable of transporting both Single Input Single Output (SISO) and Multiple Input Multiple Output (MIMO) services at any of the frequencies described above. The systems described herein can support any combination of SISO and MIMO signals across various bands of frequency spectrum. In some example embodiments, the systems described herein may provide MIMO streams for WiMAX, LTE, and HSPA services while only providing SISO streams for other services. Other combinations of MIMO and SISO services are used in other embodiments.

In examples, any of the processors described above may include or function with software programs, firmware or other computer readable instructions for carrying out various methods, process tasks, calculations, and control functions, used in the digital processing functionality described herein. These instructions are typically stored on any appropriate computer readable medium used for storage of computer readable instructions or data structures. The computer readable medium can be implemented as any available media that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless like.

Example Embodiments

Example 1 includes a method for obtaining location information regarding a wireless unit in a distributed antenna system (DAS), the method comprising: identifying a first time of arrival of a wireless signal in a time and frequency unit at a first active antenna unit (AAU); identifying a second time of arrival of the wireless signal in the time and frequency unit at a second AAU; estimating a location of a wireless unit transmitting the wireless signal based on a location of the first AAU, a location of the second AAU, and a difference between the first time of arrival and the second time of arrival; and sending to a baseband unit or serving mobile location center (SMLC), the location of the wireless unit and an indication that the location corresponds to the time and frequency unit.

Example 2 includes the method of Example 1, comprising: identifying a third time of arrival of the wireless signal in the time and frequency unit at a third AAU, wherein estimating a location includes estimating a location based on a location of the third AAU and a difference between the third time of arrival, the first time of arrival, and the second time of arrival.

Example 3 includes the method of any of Examples 1-2, wherein the time and frequency unit is a resource element of a communication protocol conforming to a long-term evolution (LTE) standard.

Example 4 includes the method of Example 3, wherein the indication that the location corresponds to the time and frequency unit includes an indication that the location corresponds to a resource block that includes the resource element.

Example 5 includes the method of any of Examples 1-4, comprising: receiving a map of an allocation of time and frequency units from a baseband unit; and determining the time and frequency unit of the first signal and the second signal based on the map.

Example 6 includes the method of any of Examples 1-5, wherein estimating a location includes using multi-lateration to determine the location.

Example 7 includes the method of any of Examples 1-6, comprising: demodulating a downlink control channel to determine a map of an allocation of time and frequency units in the uplink; and determining the time and frequency unit of the first signal and the second signal based on the map.

Example 8 includes the method of any of Examples 1-7, comprising: sending the first time of arrival from the first AAU to a location estimation module; and sending the second time of arrival from the second AAU to a location estimation module, wherein estimating the location includes estimating the location with the location estimation module and wherein sending the location to the baseband unit or SMLC includes sending the location from the location estimation module to the baseband unit or SMLC.

Example 9 includes the method of any of Examples 1-8, comprising: sending an indication that the first time of arrival corresponds to the time and frequency unit from the first AAU to the location estimation module; and sending an indication that the second time of arrival corresponds to the time and frequency unit from the second AAU to the location estimation module.

Example 10 includes the method of any of Examples 1-9, comprising: receiving a request from the baseband unit or SMLC to determine a location of a wireless unit that is allocated the time and frequency unit of the wireless signal in the uplink.

Example 11 includes a distributed antenna system (DAS) comprising: a host unit; a plurality of active antenna units (AAUs) communicatively coupled to the host unit over a respective communication link 125, the AAUs configured to wirelessly communicate with one or more wireless devices, wherein a first AAU of the plurality of AAUs is configured to identify a first time of arrival of a wireless signal in a time and frequency unit, wherein a second AAU of the plurality of AAUs is configured to identify a second time of arrival of the wireless signal in a time and frequency unit; wherein a location estimation module is configured to estimate a location of a wireless unit transmitting the wireless signal based on a location of the first AAU, a location of the second AAU, and a different between the first time of arrival and the second time of arrival, wherein the location estimation module is configured to send to the baseband unit or a serving mobile location center (SMLC), the location of the wireless unit and an indication that the location corresponds to the time and frequency unit.

Example 12 includes the DAS of Example 11, wherein a third AAU of the plurality of AAUs is configured to identify a third time of arrival of the wireless signal in a time and frequency unit, wherein the location estimation module is configured to estimate a location of a wireless unit transmitting the wireless signal based on a location of the third AAU and a difference between the third time of arrival, the first time of arrival, and the second time of arrival.

Example 13 includes the DAS of any of Examples 11-12, wherein the time and frequency unit is a resource element of a communication protocol conforming to a long-term evolution (LTE) standard.

Example 14 includes the DAS of Example 13, wherein the indication that the location corresponds to the time and frequency unit includes an indication that the location corresponds to a resource block that includes the resource element.

Example 15 includes the DAS of any of Examples 11-14, wherein the location estimation module is configured to use multi-lateration to determine the location.

Example 16 includes the DAS of any of Examples 11-15, wherein the location estimation module is implemented by the host unit.

Example 17 includes a method of estimating a location of a wireless unit with a distributed antenna system (DAS), the method comprising: receiving a request at a location estimation module in the DAS from a serving mobile location center (SMLC) to determine a location of a wireless unit allocated to a first time and frequency unit in the uplink RF spectrum; sending a command from the location estimation module to a plurality of AAUs of the DAS to generate determine respective times of arrival for a wireless signal in the first time and frequency unit; identifying a first time of arrival of a wireless signal in the first time and frequency unit; identifying a second time of arrival of the wireless signal in the first time and frequency unit; sending the first time of arrival from the first AAU to the location estimation module; sending the second time of arrival from the second AAU to the location estimation module; estimating a location of the wireless unit based on a location of the first AAU, a location of the second AAU, and a difference between the first time of arrival and a second time of arrival; and sending the location of the wireless unit to the SMLC.

Example 18 includes the method of Example 17, comprising: identifying a third time of arrival of the wireless signal in the first time and frequency unit at a third AAU; wherein estimating a location includes estimating a location based on the location of the third AAU and a difference between the third time of arrival, the first time of arrival, and the second time of arrival.

Example 19 includes the method of any of Examples 17-18, wherein the first time and frequency unit is a resource element of a communication protocol conforming to a long-term evolution (LTE) standard.

Example 20 includes the method of Example 19, wherein the request identifies a resource block in the uplink RF spectrum that is allocated to the wireless unit.

What is claimed is:

1. A method for obtaining location information regarding a wireless unit in a distributed antenna system (DAS), the method comprising:

identifying a first time of arrival of a wireless signal in a time and frequency unit at a first active antenna unit (AAU);

identifying a second time of arrival of the wireless signal in the time and frequency unit at a second AAU;

receiving a map of an allocation of time and frequency units;

determining the time and frequency unit of the signal based on the map; and estimating a location of a wireless unit transmitting the wireless signal based on a location of the first AAU, a location of the second AAU, and a difference between the first time of arrival and the second time of arrival.

2. The method of claim 1, comprising:

identifying a third time of arrival of the wireless signal in the time and frequency unit at a third AAU, wherein estimating a location includes estimating a location based on a location of the third AAU and a difference between the third time of arrival, the first time of arrival, and the second time of arrival.

3. The method of claim 1, wherein the time and frequency unit is a resource element of a communication protocol conforming to a long-term evolution (LTE) standard.

4. The method of claim 3, wherein the indication that the location corresponds to the time and frequency unit includes an indication that the location corresponds to a resource block that includes the resource element.

5. The method of claim 1, wherein estimating a location includes using multi-lateration to determine the location.

6. The method of claim 1, comprising:

demodulating a downlink control channel to determine the map of the allocation of the time and frequency units in the uplink; and determining the time and frequency unit of the signal based on the map.

7. The method of claim 1, comprising:

sending an indication that the first time of arrival corresponds to the time and frequency unit from the first AAU to a location estimation module; and sending an indication that the second time of arrival corresponds to the time and frequency unit from the second AAU to the location estimation module.

8. The method of claim 1, comprising:

receiving a request to determine a location of a wireless unit that is allocated the time and frequency unit of the wireless signal in the uplink.

9. The method of claim 1, comprising:

sending the first time of arrival from the first AAU to a location estimation module; and sending the second time of arrival from the second AAU to the location estimation module, wherein estimating the location includes estimating the location with the location estimation module.

10. A distributed antenna system (DAS) comprising:

a host unit;

a plurality of active antenna units (AAUs) communicatively coupled to the host unit over a respective communication link, the AAUs configured to wirelessly communicate with one or more wireless devices, wherein a first AAU of the plurality of AAUs is configured to identify a first time of arrival of a wireless signal in a time and frequency unit and to send the first time of arrival to a location estimation module comprising processing circuitry;

wherein a second AAU of the plurality of AAUs is configured to identify a second time of arrival of the wireless signal in a time and frequency unit and to send the second time of arrival from the second AAU to the location estimation module;

wherein the location estimation module is configured to estimate a location of a wireless unit transmitting the wireless signal based on a location of the first AAU, a location of the second AAU, and a difference between the first time of arrival and the second time of arrival; and wherein the host unit is configured to receive a map of an allocation of time and frequency units, and to determine the time and frequency unit of the first signal and the second signal based on the map.

11. The DAS of claim 10, wherein a third AAU of the plurality of AAUs is configured to identify a third time of arrival of the wireless signal in a time and frequency unit, wherein the location estimation module is configured to estimate a location of a wireless unit transmitting the wireless signal based on a location of the third AAU and a difference between the third time of arrival, the first time of arrival, and the second time of arrival.

12. The DAS of claim 10, wherein the time and frequency unit is a resource element of a communication protocol conforming to a long-term evolution (LTE) standard.

13. The DAS of claim 12, wherein the indication that the location corresponds to the time and frequency unit includes an indication that the location corresponds to a resource block that includes the resource element.

14. The DAS of claim 10, wherein the location estimation module is configured to use multi-lateration to determine the location.

15. The DAS of claim 10, wherein the location estimation module is implemented by the host unit.

16. A method of estimating a location of a wireless unit with a distributed antenna system (DAS), the method comprising:

receiving a request at a location estimation module in the DAS to determine a location of a wireless unit allocated to a first time and frequency unit in the uplink RF spectrum;

wherein the request identifies a resource block in the uplink RF spectrum that is allocated to the wireless unit;

sending a command from the location estimation module to a plurality of AAUs of the DAS to determine respective times of arrival for a wireless signal in the first time and frequency unit;

identifying a first time of arrival of a wireless signal in the first time and frequency unit;

identifying a second time of arrival of the wireless signal in the first time and frequency unit;

sending the first time of arrival from the first AAU to the location estimation module;

sending the second time of arrival from the second AAU to the location estimation module; and estimating a location of the wireless unit based on a location of the first AAU, a location of the second AAU, and a difference between the first time of arrival and a second time of arrival.

17. The method of claim 16, comprising:

identifying a third time of arrival of the wireless signal in the first time and frequency unit at a third AAU, wherein estimating a location includes estimating a location based on the location of the third AAU and a difference between the third time of arrival, the first time of arrival, and the second time of arrival.

18. The method of claim 16, wherein the first time and frequency unit is a resource element of a communication protocol conforming to a long-term evolution (LTE) standard.

* * * * *